Patented June 5, 1951

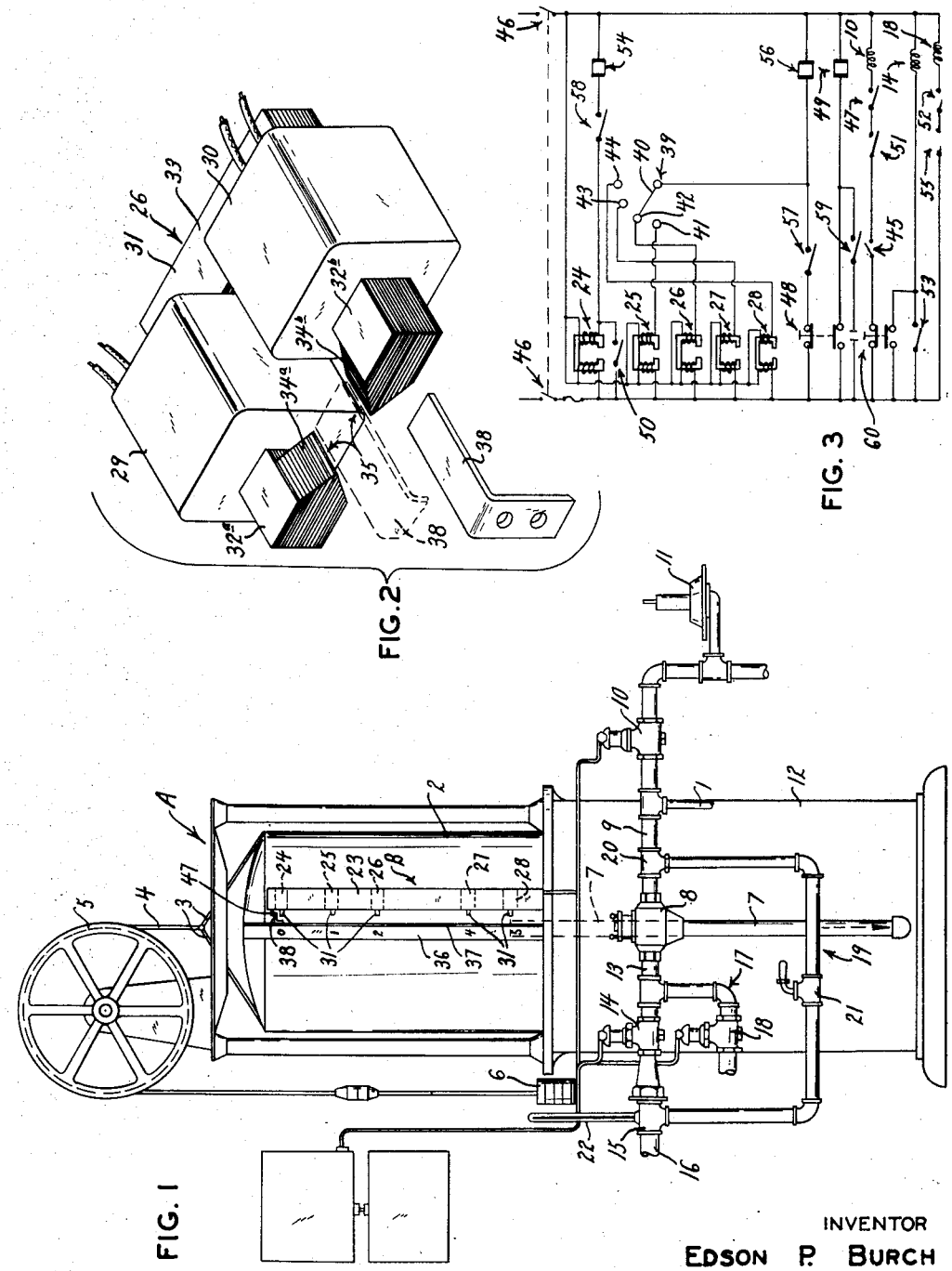
INVENTOR
EDSON P. BURCH
ATTORNEY

2,555,730

UNITED STATES PATENT OFFICE 2,555,730

GAS METER PROVER APPARATUS

Edson P. Burch, Webster Groves, Mo., assignor to Electronic Tester of Gas Meters, Inc., St. Louis, Mo., a corporation of Missouri Application October 27, 1948, Serial No. 56,729

6 Claims. (Cl. 73—3)

1

This invention relates to gas meter prover apparatus of the type adapted for use in testing the accuracy of movement and registration of the registering means of gas meters by passing through the gas meters being tested accurately measured volumes of air, or other fluid, the predominant object of the invention being to provide an improved apparatus of this type which is relatively simple in construction and operation, and is so completely automatic in its operation that the opportunity for human error to effect the gas meter testing operations is reduced to a minimum.

Commercial gas meters of various types having bellows displacement means for determination of the volume of gas passed through the meters, and provided with geared indexing means for registering said volume of gas passed through the meters, have heretofore been tested for accuracy by passing through the meters accurately measured volumes of air from accurately calibrated air tanks or prover bells connected to the meters and controlled manually. In making this type of test, the operator observed the movement of the prover index hand with respect to the meter prover dial while passing an amount of air through the meter that would cause the prover index hand to make one revolution, which was equivalent to the registration of passage through the meter of two cubic feet of air. The accuracy of such a test was dependent on the keenness of the eye of the operator making the test, and his coordination of eye and hand, inasmuch as the flow of air to the meter was shut off manually by the operator when the index hand of the meter had made a complete revolution, as nearly as could be judged by the eye, and the actual volume passed through the meter was determined by the shrinkage in volume of the air in the air tank or prover bell. If the test indicated that the volume of air passed through the meter was more or less than exactly two cubic feet, the meter was registered as either fast or slow and proper adjustments were made of its mechanism to bring it to accuracy, the test being repeated until the meter registered accurately.

The testing operation briefly described above was subject to a number of possibilities of error, and the prime purpose of this invention is to provide a simple and improved testing apparatus in the use and operation of which these possibilities of error are eliminated. Briefly stated, the starting and stopping of the gas meter prover of the present invention is controlled automatically through the operation of electrical means that controls flow of electrical current that operates electrical means which opens and closes valve means when exactly the predetermined volume of air to be used in the test has been passed from the bell of the prover, to and through the meter under test. The apparatus of the present invention differs in its operation from the manual meter testing method described above, in that an accurately calibrated prover bell is established as the standard of comparison and the flow of air from this prover bell to the meter under test is accurately controlled in an automatic manner so as to eliminate human error.

Fig. 1 is a front elevation of the improved gas meter prover apparatus of the present invention.

Fig. 2 is a bracketed perspective view of a portion of the meter prover apparatus of this invention.

Fig. 3 is a diagrammatical view illustrating the electrical wire arrangement of the improved gas meter prover apparatus of the present invention.

In the drawings, wherein is shown for purposes of illustration, merely, one embodiment of the invention, A designates in Fig. 1 the gas meter prover apparatus generally. The gas meter prover apparatus A comprises a lower tank portion 1 and a bell 2 which is supported for vertical movement with respect to said lower tank portion 1, there being a body of water (not shown) contained in the lower tank portion 1 whose surface provides the bottom wall of an air chamber within the bell. The bell 2 has suitably attached to its upper portion, by means of attaching elements 3, a flexible member 4, said flexible member being passed over a rotatably supported pulley 5 and having weights 6 attached to its free end which serve to counterbalance the weight of the bell 2.

Forming a part of the gas meter prover apparatus A is a pipe assembly which includes a pipe 7 that communicates with the air chamber within the bell 2 and extends downwardly therefrom within the interior of the lower tank portion 1 of the prover, said pipe 7 extending through a lower wall portion of the prover tank and extending upwardly at the exterior of the lower tank portion of the prover to a member 8. Connecting into the member 8 is a pipe 9 which leads from a source of air (not shown), said pipe 9 being provided with a magnetic valve 10 which, as will presently appear herein, controls the passage of air into the air chamber of the prover bell 2. The pipe 9 is provided also with a pressure regulator 11 which controls the pressure of the air that passes through said pipe 9 to the air chamber of the prover bell, and additionally said pipe 9 is provided with a connection 12 which is adapted to lead to a pressure gauge (not shown).

Connected into the member 8 is a pipe 13 in which is interposed a magnetic valve 14, said magnetic valve 14 being connected to a connection 15 into which is also connected a pipe 16 which leads to the inlet of a meter to be tested, said magnetic valve 14 serving to control the flow of air from the prover bell 2 to a meter being tested with the aid of the gas meter prover apparatus. Connected into the pipe 13 is a pipe and fitting assembly 17, and connected into said pipe and fitting assembly 17 is a magnetic valve 18 which, as will presently appear herein, serves to control leveling of the prover bell 2 by venting air from said bell to atmosphere. Additionally the general pipe assembly of the gas meter prover apparatus includes a pipe and fitting assembly 19 which provides a by-pass around the magnetic valves 14 and 18, one end of said by-pass being connected into a fitting 20 which is connected in the pipe 9, and the opposite end of said by-pass being connected into the fitting 15 into which the magnetic valve 14 and the pipe 16 are connected. The pipe and fitting assembly 19 which provides the by-pass around the magnetic valves 14 and 18 has interposed therein a manually operable valve 21 which, on actuation thereof, permits air to flow from the prover bell 2 to the meter being tested to allow for manual testing of the meter, if required, or to permit purging of the meter so as to bring the prover index dial hand of the meter to its starting position. If desired, the fitting 15 may have connected thereto a suitable thermometer 22, in order that the temperature of the air passing to the meter being tested may be indicated.

The improved gas meter prover apparatus of this invention includes a control unit B which comprises a housing 23 that is supported in a fixed position by being suitably secured to the top portion of the lower tank 1. Supported within the housing is a plurality of control coil structures 24, 25, 26, 27 and 28, each of said control coil structures comprising a pair of spaced coils 29 and 30 and a laminated iron core 31 and said coil structures functioning as small transformers. The core 31 is substantially U-shaped, as is shown in Fig. 2, said core comprising parallel portions 32a and 32b which extend through the coils 29 and 30, and a bridge portion 33 which joins said parallel portions 32a and 32b. Also, the end portions of the parallel portions 32a and 32b which are remote from the bridge portion 33 are provided with inwardly extended, tapered portions 34a and 34b which are separated to provide an air gap 35 therebetween.

The bell 2 of the gas meter prover A is provided with a vertically disposed scale 36 which is suitably fixed thereto for movement therewith, and this scale is provided with the usual graduations formed on scales of prover bells. In other words, the graduations on the scale 36 may include a zero mark, and one, two, four and five cubic feet marks, if the bell is a five cubic feet prover bell, and additional cubic feet marks if it be a larger bell. Secured to the scale 36 is a vertically disposed plate 37 to which is suitably secured an angular lug 38 which is formed of soft iron, said lug having a horizontal leg which projects laterally from the plate 37 and is so disposed relative to the control coil structures 24, 25, 26, 27, and 28 that it may pass into and through the air gaps 35 between the tapered portions 34a and 34b of the cores 31 of the various control coil structures when the prover bell moves upwardly or downwardly.

In describing the operation of the improved gas meter prover A of the present invention it will be assumed that the electric power is off and that the prover bell 2 is in its lowermost position with the meter prover A connected to a meter to be tested. Let it be assumed, also, that it is desired to pass two cubic feet of air through the meter being tested. As is shown in Fig. 3, the electrical wiring system of the gas meter prover A includes a rotary switch 39 which includes a movable contact element 40 that is movable into and out of contact with a plurality of contacts 41, 42, 43, and 44, and in preparing for the test the movable contact element 40 of the rotary switch 39 is moved into contact with the proper contact of the contacts 41, 42, 43, and 44, the contact 43, for instance. Additionally, the wiring system of the gas meter prover A includes an air switch 45 (Fig. 3) and in preparaing for a meter test this air switch is closed, as is the power switch 46. This energizes the primaries of the five coil structures 24, 25, 26, 27, and 28, which function as transformers, and of the air valve 10, all other circuits being open. The air valve 10 opens and air flows into the bell 2 causing said bell to move upwardly and when said bell reaches its extreme upper position a suitable limit switch 47 is opened by being engaged by the angular lug 38 and the air valve 10 is deenergized and closed to put the prover in condition for a test.

The actual test is started by depressing a start button 48 momentarily and this energizes a relay 49 which picks up, sealing itself in through contacts 50. The relay contacts 51 open thereby disabling the air valve circuit, so that said air valve 10 would not open as soon as the angular lug 38 moves downwardly from the limit switch on downward movement of the bell 2, and relay contacts 52 close so as to energize and open the vent valve 18 and release air in the prover bell 2 to atmosphere and thus permit the prover bell to descend. When the bell 2 descends to a point where the horizontal leg of the lug 38 passes through the air gap 35 of the core of the coil structure 24, which is at the zero point on the scale of the prover bell 2, sufficient voltage is generated in the secondary of the core structure 24 to pick up the contacts 50 with the result that said contacts 50 are sealed in through the contacts 53, and a relay 54 de-energizes the vent valve 18 by opening the contacts 55 and opens the valve 14 by closing the contacts 50. The closing and opening of the valves 18 and 14 transfers the flow of air from atmosphere to the meter being tested so that air is caused to flow from the descending bell 2 through the meter under test, such flow of air to the meter starting at the zero point on the prover scale.

The test is ended by the horizontal leg of the lug 38 moving into the air gap 35 of whichever coil structure 25, 26, 27, or 28, is connected by the rotary switch 39 to the relay 56. In Fig. 3 the two cubic feet coil structure 26 is connected by the rotary switch 39 to the relay 56, and when the horizontal leg of the lug 38 moves into the air gap 35 of the core of the coil structure 26 said coil structure 26 is energized and it seals in through contacts 57, and the test is ended by the opening of the contacts 58, such opening of said contacts 58 de-energizing relay 54, which drops out, opening contacts 53 in the circuit of the valve 14 so as to de-energize and close said valve 14. Contacts 59 also open thereby dropping out relay 49 whereupon contacts 51 reclose, re-establishing the circuit of the air valve 10, and the prover bell refills with air until the limit switch 47 opens and de-energizes said valve 10. The prover is now ready for the next set and when again set in operation to perform another test the depression of the start button 48 will first de-energize the relay 56, since it is left sealed in after every test, the second test being otherwise the same as described above. Operation of the purge button 60 simply opens the valve 18 while closing the valve 10.

It is important to note that the coil structures 24, 25, 26, 27, and 28 are related, respectively, to the zero, one, two, four and five cubit feet marks on the scale of the bell 2 of the gas meter prover A, and that said coil structures 25, 26, 27, and 28 are electrically connected, respectively, to the contacts 41, 42, 43, and 44 of the rotary switch 39. Therefore, the amount of air passed through a meter under test may be established by merely setting the movable contact element 40 of the rotary switch 39 on the appropriate contact 41, 42, 43, or 44 of said rotary switch and the descent of the bell during the test will stop when the lug 38 passes into the air gap 35 of the effective coil structure. With further respect to the coil structures 24, 25, 26, 27, and 28 it is pointed out that although the A. C. coils of said coil structures are continuously energized, when the power switch 46 is closed, current will not flow through the coil structures because of the relatively wide air gaps 35 in the cores 31 of said coil structures. However, when the widths of these air gaps are reduced substantially by movement of the horizontal leg of the lug 38 into said air gaps, enough current is induced in the coil structures to energize the relay 56.

I claim:

1. A meter-testing apparatus comprising a prover including a movable member providing a chamber for a meter-testing medium, conduit means leading from the chamber of said movable member and adapted to be connected to a meter to be tested, an electrically actuated valve interposed in said conduit means and operable to control passage of testing medium from the chamber of said movable member to the meter being tested, and electrical means for controlling actuation of said electrically actuated valve, the last-mentioned means and said electrically actuated valve being connected in an electrical circuit and said last-mentioned means comprising a coil and core structure which is supported in a stationary position and through which voltage normally does not pass, and an element formed of material of the character of soft iron and movable with said movable member of the prover into such position relative to the core of said coil and core structure as to cause voltage to pass through said coil and core structure and actuate said electrically actuated valve.

2. A meter-testing apparatus comprising a prover including a movable member providing a chamber for a meter-testing medium, conduit means leading from the chamber of said movable member and adapted to be connected to a meter to be tested, an electrically actuated valve interposed in said conduit means and operable to control passage of testing medium from the chamber of said movable member to the meter being tested, and electrical means for controlling actuation of said electrically actuated valve, the last-mentioned means and said electrically actuated valve being connected in an electrical circuit and said last-mentioned means comprising a coil and core structure supported in a stationary position and the core of which is provided with an air gap whereby voltage normally does not pass through said coil and core structure, and an element formed of material of the character of soft iron and movable with said movable member of the prover into said air gap of said core to cause voltage to pass through said coil and core structure and actuate said electrically actuated valve.

3. A meter-testing apparatus comprising a prover including a movable member providing a chamber for a meter-testing medium, conduit means leading from the chamber of said movable member and adapted to be connected to a meter to be tested, an electrically actuated valve interposed in said conduit means and operable to control passage of testing medium from the chamber of said movable member to the meter being tested, and electrical means for controlling actuation of said electrically actuated valve, the last-mentioned means and said electrically actuated valve being connected in an electrical circuit and said last-mentioned means comprising a coil and core structure supported in a stationary position and comprising a pair of coils and a core which is provided with an air gap whereby voltage normally does not pass through said coil and core structure, and an element formed of material of the character of soft iron and movable with said movable member of the prover into said air gap of said core ot cause voltage to pass through said coil and core structure and actuate said electrically actuated valve.

4. A meter-testing apparatus comprising a prover including a movable member providing a chamber for a meter-testing medium, conduit means leading from the chamber of said movable member and adapted to be connected to a meter to be tested, an electrically actuated valve interposed in said conduit means and operable to control passage of testing medium from the chamber of said movable member to the meter being tested, and electrical means for controlling actuation of said electrically actuated valve, the last-mentioned means and said electrically actuated valve being connected in an electrical circuit and said last-mentioned means comprising a plurality of coil and core structures supported in stationary positions and through which voltage normally does not pass, means for rendering one or another of said coil and core structures electrically effective, and an element formed of material of the character of soft iron and movable with said movable member of the prover into such position relative to the core of the electrically effective coil and core structure as to cause voltage to pass through said electrically effective coil and core structure and actuate said electrically actuated valve.

5. A meter-testing apparatus comprising a prover including a movable member providing a chamber for a meter-testing medium, conduit means leading from the chamber of said movable member and adapted to be connected to a meter to be tested, an electrically actuated valve interposed in said conduit means and operable to control passage of testing medium from the chamber of said movable member to the meter being tested, and electrical means for controlling actuation of said electrically actuated valve, the last-mentioned means and said electrically actuated valve being connected in an electrical circuit and said last-mentioned means comprising a plurality of vertically spaced coil and core structures supported in stationary positions and through which voltage normally does not pass, means for rendering one or another of said coil and core structures electrically effective, and an element formed of material of the character of soft iron and movable with said movable member of the prover into such position relative to the core of the electrically effective coil and core structure as to cause voltage to pass through said electrically effective coil and core structure and actuate said electrically actuated valve.

6. A meter-testing apparatus comprising a prover including a movable member providing a chamber for a meter-testing medium, conduit means leading from the chamber of said movable member and adapted to be connected to a meter to be tested, an electrically actuated valve interposed in said conduit means and operable to control passage of testing medium from the chamber of said movable member to the meter being tested, and electrical means for controlling actuation of said electrically actuated valve, the last-mentioned means and said electrically actuated valve being connected in an electrical circuit and said last-mentioned means comprising a plurality of coil and core structures supported in stationary positions and the cores of which are provided with air gaps whereby voltage does not normally pass through said coil and core structures, means comprising a selector switch for rendering one or another of said coil and core structures electrically effective, and an element formed of material of the character of soft iron and movable with said movable member of the prover into the air gap of the core of the electrically effective coil and core structure so as to cause voltage to pass through said electrically effective coil and core structure and actuate said electrically actuated valve.

EDSON P. BURCH.

REFERENCES CITED

The following references are of record in the file of this patent:

UNITED STATES PATENTS

| Number | Name | Date |
|---|---|---|
| 1,171,405 | Ablon | Feb. 15, 1916 |
| 1,757,637 | Koch | May 6, 1930 |
| 1,780,952 | Symmes | Nov. 11, 1930 |
| 2,448,616 | Oakley et al. | Sept. 7, 1948 |